Dec. 20, 1960  E. F. WHITE, JR  2,965,203
MAGNETIC CLUTCHES

Filed Jan. 3, 1956  3 Sheets-Sheet 1

INVENTOR
EUGENE F. WHITE, JR.
BY Ray Eilers ATTY.

Dec. 20, 1960     E. F. WHITE, JR     2,965,203
MAGNETIC CLUTCHES Filed Jan. 3, 1956     3 Sheets-Sheet 3

INVENTOR
EUGENE F. WHITE, JR.
BY Rey Eilers ATT'Y.

United States Patent Office 2,965,203
Patented Dec. 20, 1960

2,965,203

MAGNETIC CLUTCHES

Eugene F. White, Jr., Ferguson, Mo., assignor to Autotronics, Inc., a corporation of Missouri Filed Jan. 3, 1956, Ser. No. 557,042

12 Claims. (Cl. 192—18)

The invention relates to improvements in magnetic clutches. More particularly, this invention relates to improvements in compact and highly efficient magnetic clutches.

It is therefore an object of the present invention to provide an improved compact and highly efficient magnetic clutch.

It is frequently desirable to provide magnetic clutches which can be selectively energized or de-energized to drive or free a driven shaft. Such clutches must provide prompt action, and they must be efficient. A number of such clutches have been proposed, and some of them have been used. The present invention provides such a magnetic clutch, and that clutch is much more efficient than prior magnetic clutches.

The present invention attains increased efficiency despite compactness of size by making the housing of the clutch of magnetic material and by utilizing that housing as part of the magnetic path for that clutch. In addition, the present invention attains still further increases in efficiency despite compactness in size by making the driving shaft of the clutch of magnetic material and by utilizing that shaft as part of the magnetic path for that clutch, and by making the coil form, for the magnetic clutch, of magnetic material so it can be utilized as part of the magnetic path for that clutch. As a result, the major components of the magnetic clutch of the present invention serve the dual purpose of being structural elements and also of being parts of the magnetic path for that clutch. It is therefore an object of the present invention to provide a magnetic clutch wherein the housing of the clutch, the driving shaft, and the coil form are made of magnetic material and are utilized as part of the magnetic path for the magnetic clutch.

The magnetic clutch of the present invention has a driven shaft and a driving shaft, and it has an axially movable clutch face. That clutch face is rotatable with one of those shafts while being axially movable relative to that one shaft. A mating clutch face is rotatable with the other of those shafts; and the axially movable clutch face selectively moves into engagement with or out of engagement with that mating clutch face. Those clutch faces are held for concentric rotation, whether they are in engagement with, or separated from, each other.

The magnetic clutch of the present invention can be used to drive a driven shaft at high rates of speed, and hence it is necessary to hold all of the rotating parts of that magnetic clutch in precise concentricity. At the same time, it is necessary to make the various parts of the magnetic clutch readily assembleable and disassembleable. Some prior magnetic clutches have mounted their bearings in plates or housings that were threaded, and that were held in position by mating threads on the clutch housing. The threaded engagement between those plates or housings and the clutch housing will hold the bearings fixedly in position, but that engagement can not be depended upon to provide precise concentricity; threaded connections being inherently incapable of assuring the requisite preciseness. The present invention avoids the prior lack of precise concentricity by mounting the bearings of the magnetic clutch in separable parts of the clutch housing, and by providing each of those parts of that housing with precisely machined and precisely concentric mating surfaces. When those mating surfaces are pressed into engagement with each other, the bearings are precisely concentric.

Magnetic clutches usually rely upon metal-to-metal engagement at the clutching faces to provide the frictional forces needed to transmit the driving forces from the driving shaft to the driven shaft. Where the magnetic clutches are large, the total area of engagement between the clutching faces can be great enough to assure full transmission of power from the driving shaft to the driven shaft; but where the magnetic clutches must be compact, the total area of engagement between the clutching faces is not great enough to assure full transmission of power from the driving shaft to the driven shaft, particularly where the forces to be transmitted are high. The metal-to-metal engagement at the clutching faces is presently thought to be necessary in magnetic clutches to keep the magnetic reluctance of the magnetic path of the magnetic clutch as low as possible. However, the present invention obviates that need of metal-to-metal engagement at the clutching faces by providing such a highly efficient magnetic path for the magnetic clutch that a small air gap can be used, and by providing a non-metallic clutch face that is spaced from the magnetic path of the magnetic clutch. With this arrangement, the magnetic path does not have to pass through the non-metallic clutch face; instead it passes wholly through magnetic material and then through a tiny air gap. Further, with this arrangement, the magnetic clutch of the present invention is able to have the increased efficiency inherent in a metal-to-non-metal engagement at the clutch faces. It is therefore an object of the present invention to provide a magnetic clutch wherein the clutch faces are spaced away from the magnetic path of the magnetic clutch, and wherein one of those clutch faces is non-metallic.

Some prior magnetic clutches were made so they provided a braking action as well as a clutching action. In particular, some of those magnetic clutches were made so they held the driven shafts stationary whenever those clutches were de-energized, and so they connected the driving and driven shafts together whenever those clutches were energized. In theory, the driven shaft of each of these prior magnetic clutches was held stationary until that magnetic clutch was energized, and then that driven shaft was immediately connected to the driving shaft when that magnetic clutch was energized. Such a relationship is very important where the magnetic clutch is used in the "memory" circuit of a computing machine or other machine. Actually, however, none of the prior magnetic clutches was able to hold its driven shaft stationary until that shaft was connected to and driven by the driving shaft; instead, that driven shaft was momentarily freed from the braking surface before it was connected to the driving shaft. This momentary freeing of the driven shaft occurred during the very short interval of time between the instant the movable clutch element moved out of engagement with the braking surface and moved into engagement with the clutching surface; and this momentary freeing of the driven shaft permitted that shaft to turn. Any such turning of the driven shaft is objectionable. The present invention obviates this objection by providing a magnetic clutch that positively holds the driven shaft against rotation until after that driven shaft has been connected to the driving shaft. As a result, any and all rotation of the driven shaft of the magnetic clutch provided by the present invention is completely and exclusively under the control of the driving shaft. It is therefore an object of the present invention to provide a magnetic clutch wherein the driven shaft is positively held against rotation until it is connected to the driving shaft.

The magnetic clutch provided by the present invention has a clutch plate that selectively engages a braking surface of the housing of the clutch to brake the driven shaft or engages a clutch face on the driving shaft to interconnect the driving and driven shafts. That clutch plate moves substantially axially of the driven shaft in its movement between its braking and clutching positions, but that clutch plate actually shifts its axis during that movement. Specifically, that clutch plate inclines its axis to the axis of the driven shaft as that clutch plate begins to move from its braking position to its clutching position. That inclination of the axis of that clutch plate enables one portion of the clutching face of that plate to engage the clutch face on the driving shaft while other portions of that clutch plate are still in engagement with the braking surface of the clutch housing. This is important since it makes certain that the clutch plate is never free to rotate independently of the driving shaft. As the clutch plate continues to move toward its clutching position, the axis of that plate will shift again and permit the frictional forces between that clutch plate and the clutch face on the driving shaft to increase still more, and permit the frictional forces between that clutch plate and the braking surface to decrease still more. Very quickly, the axis of the clutch plate will again become coaxial with the axis of the driven shaft; and at such time the clutch plate will be in full engagement with the clutch face on the driving shaft and will be completely out of engagement with the braking surface of the clutch housing. A similar series of inclinations of the axis of the clutch plate relative to the axis of the driven shaft is experienced whenever the clutch plate moves back toward the braking surface of the housing of the magnetic clutch. This arrangement makes certain that the driven shaft can not be rotated by rotative forces other than the rotative forces supplied by the driving shaft; and hence, this arrangement provides fully controlled positioning of the driven shaft. It is therefore an object of the present invention to provide a magnetic clutch which has a clutch plate that inclines its axis to the axis of the driven shaft as it moves between its braking and clutching positions.

The present invention attains this vital inclination of the axis of the clutch plate relative to the axis of the driven shaft by mounting that clutch plate on a leaf spring carried by the driven shaft. That spring will be formed so it resists movement of the clutch plate in one direction and so it fosters movement of that plate in the opposite direction. The spring will apply a lesser force to one portion of that clutch plate than it does to any other portion of that clutch plate, and hence it will let that one portion of that plate move in the said one direction before it lets any other portion of that plate move in that direction. Conversely, that spring will force other portions of that clutch plate to move in the opposite direction before it will make that one portion of that plate move in that direction. It is therefore an object of the present invention to provide a leaf spring to carry the clutch plate of a magnetic clutch and to form that spring so it applies a lesser force to one portion of that plate than it applies to any other portion of that plate.

The leaf spring provided by the present invention is also desirable because it can operate successfully even when it is subjected to intense axial vibrations of high frequency. Helical springs on the other hand can not do so, because the turns at the longitudinal centers of those springs can begin to shift back and forth in the axial direction under such vibration; and that shifting can sometimes become so pronounced that the free ends of those springs begin to shift their positions. Any such shifting could be very objectionable where the magnetic clutches are incorporated into the "memory" circuits of computing machines and the like, because that shifting could release the brakes and permit the driven shafts to rotate when they were supposed to be braked against rotation.

This shifting of the center turns of the helical springs appears to occur because those turns are under zero pressure in the axial direction, and because that zero pressure permits even moderate forces to act upon the mass of those turns and set those turns in motion. The turns adjacent the center turns do have a pressure upon them, but the small pressures to which they are subject can not resist the momentum which the axial forces develop in the center turns. Consequently, the readily initiated shifting in the center turns soon communicates itself to the adjacent turns; and in some instances the free ends of those springs begin to shift. The leaf spring provided by the present invention does not have any portions of zero pressure when that spring is under stress; and hence that spring provides fully reliable operation at all times.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention, and that the invention will be defined by the appended claims.

Referring to the drawing in detail, the numeral 20 denotes a cylinder of magnetic material. The exterior of that cylinder is carefully machined to make it precisely cylindrical, particularly that portion of the exterior surface which is adjacent the right hand end of that cylinder. An external annular groove 22 is formed in the cylinder 20 adjacent the left hand end of that cylinder. This groove coacts with an annular shoulder 24 at the left hand end of that cylinder to facilitate the mounting of the cylinder in a bulkhead, panel or similar support. Specifically, the annular shoulder 24 will telescope into an opening in the bulkhead, panel or other support, and clamps will extend between the groove 22 and the bulkhead, panel or other support to hold the shoulder 24 against dislodgement from that opening.

An axial, centrally located opening 28 is provided at the left hand end of the cylinder 20. An annular projection 26 is formed on the left hand end face of the cylinder 20, and that projection starts at the opening 28 and extends outwardly to a circular line intermediate the opening 28 and the annular shoulder 24.

A shallow cylindrical recess 30 is formed in the left hand end of the cylinder 20, and that recess has a diameter which is considerably larger than the diameter of the opening 28. The recess 30 is contiguous with, and in communication with, a deep, larger diameter cylindrical recess 32. This latter recess extends all the way to the right hand end of the cylinder 20. The surfaces of the recesses 30 and 32 are carefully machined, and they are made precisely concentric with the exterior of the cylinder 20. A shoulder 34 is provided intermediate the recesses 30 and 32, and that shoulder is radially directed.

An anti-friction bearing 38 is set in the circular recess 30, and the end face of that recess is undercut, as at 36, to provide full clearance for the inner race of that bearing. The outer race of that bearing engages, and is held by, the inner surface of the recess 30. The races and balls of the anti-friction bearing 38 are made of magnetic material so they can serve as part of the magnetic path in the magnetic clutch.

The numeral 40 denotes the coil form for the magnetic clutch provided by the present invention, and that coil form is made of magnetic material. That form has the configuration of an elongated, flanged hollow cylinder. The flange is dimensioned so it fits within the recess 32 and so the left hand face of that flange bears against the shoulder 34. When the flange of the coil form 40 is against the shoulder 34, the cylindrical portion of that coil form is coaxial with the cylinder 20.

A spacer 42 of a light-weight non-magnetic material such as aluminum is made in the form of a flanged sleeve. This spacer telescopes over the cylindrical portion of the coil form 40, and its flange telescopes within the recess 32. The free end of the sleeve of the spacer 42 abuts the flange on the coil form 40. This spacer serves as the left hand end of the space which will be occupied by the turns of the coil of the magnetic clutch. An annular plate or disc 50 of sturdy non-magnetic material, as for example stainless steel, is pressed onto the right hand end of the cylindrical portion of the coil form 40; and that plate or disc constitutes the right hand end of that space. Substantially all of the annular space between the spacer 42 and the annular plate or disc 50 will be filled with turns, and a few of those turns are shown in the drawing. Insulated leads 46 extend into the space defined by the spacer 42 and by the flange of the coil form 40, and those leads are suitably connected, as by solder, to the terminals of the coil 48. Those terminals extend through openings, not shown, in the flange of spacer 42. The insulated leads 46 extend outwardly through bushings 44 which are threaded into radially directed openings in the cylinder 20.

The coil form 40, the spacer 42, the coil 48 and the annular plate 50 constitute a unit which is assembled and then bodily telescoped into the recess 32. A locking ring 52 is pressed into the right hand end of the recess 32 to hold the coil form and its mounted elements against accidental separation from the cylinder 20. This locking ring is made of non-magnetic material, as for example stainless steel. Whenever it is desirable to do so, the locking ring 52 can be withdrawn from the recess 32; and thereupon the coil form and its mounted elements can be withdrawn as a unit from that recess. This facilitates ready inspection, repair or replacement of the coil 48 or its terminals.

A cup-like closure 54 is provided for the right hand end of recess 32. That closure is made of sturdy non-magnetic material as for example, stainless steel. A cylindrical recess 56 is formed at the open end of the closure 54, and that recess is precisely machined. That recess is made concentric with the exterior of the cylinder 20.

An annular projection 58 is provided at the inner face of the end wall of the closure 54, and that annular projection is machined to provide a seat 60 for a sleeve bearing 62. That sleeve bearing is pressed tightly into the seat 60. The interaction of the concentric recess 56 of closure 54 and the concentric exterior of cylinder 20 holds the sleeve bearing 62 precisely concentric with the anti-friction bearing 38 held in the recess 30 of cylinder 20.

The sleeve bearing 62 rotatably supports one end of a driven shaft 64. That shaft is longer than the cylinder 20, and its left hand end projects outwardly beyond the left hand end of cylinder 20. A leaf spring 68 is formed with three circumferentially-spaced, radially-extending arms, and those arms project outwardly from the hub 69 of that spring. That hub is fixedly secured to the driven shaft 64, adjacent the right hand end of that shaft, by a soldering, brazing or like operation. The three radially extending arms of the spring 68 are bowed, as indicated particularly in Figs. 3, 4 and 7. Those arms are all of the same thickness, but they are of different widths. For example, one arm has a width of X1, another arm has a width of X2, and the remaining arm has a width of X3. The dimension X1 is the greatest and the dimension X3 is the least; but those dimensions are not much different. For example, where the total overall diameter of the spring 68 is about three quarters of an inch the dimension X2 will exceed X3 by one or two thousandths of an inch, and the dimension X1 will exceed X2 by a similar amount. While the differences between dimensions X1, X2 and X3 are small, they are very important because they enable the arms to provide three different resilient forces. Thus, the arm with the dimension X3 can provide a predetermined resilient force, the arm with the dimension X2 can provide a greater predetermined resilient force, and the arm with the dimension X1 can provide a still greater predetermined resilient force.

Openings 70 are provided in the outer ends of the arms of the spring 68. Those openings are in register with circumferentially-spaced, threaded openings in a brake 72 of annular form. Those openings are also in register with circumferentially spaced, countersunk openings in a clutch plate 76 of annular form. The brake can be made of a light-weight non-magnetic material, such as aluminum, but the clutch plate 76 must be made of magnetic material. Screws 78 extend through the openings in the clutch plate 76 and through the openings 70 in the arms of the spring 68 and seat in threaded openings of the brake 72. Those screws positively lock the clutch plate 76 and the brake 72 to the spring 68 and to each other.

The brake 72 has a non-metallic facing 74, preferably of cork; and that facing will be cemented or otherwise secured to the brake 72. That facing will coact with the inner surface of the end wall of closure 54 to hold the brake 72 against rotation. This, of course, holds the spring 68 and the driven shaft 64 against rotation; and it also holds the clutch plate 76 against rotation. However, the brake facing 74 can be moved away from that end wall to permit rotation of the brake 72, the driven shaft 64 and the clutch plate 76 relative to the closure 54 and cylinder 20. The amount of force which the spring 68 applies to the brake 72 to urge it against the end wall of closure 54 will be determined by the distance between that end wall and the hub of that spring. A washer 66 is telescoped over the right hand end of the driven shaft 64, and that washer will be disposed between the hub of spring 68 and the sleeve bearing 62. That washer will serve as a spacer or shim and limit movement of the driven shaft 64 toward the end wall of closure 54. A washer 80 is telescoped over the left hand end of driven shaft 64, and that washer is disposed between the hub of the spring 68 and the inner race of an anti-friction bearing 82. The washer 80 will serve as a spacer or shim and limit movement of the driven shaft 64 away from the end wall of closure 54. Consequently, the washers 66 and 80 determine the axial position of driven shaft 64 and of the spring 68 thereon; and thus they determine the force that the brake facing 74 applies to the end wall of closure 54. The washers 66 and 80 are telescoped onto the driven shaft 64 after the hub of the spring 68 has been soldered, brazed or otherwise secured in position on that driven shaft.

The inner race of the anti-friction bearing 82 is telescoped over the driven shaft 64, and it will be supported by the right hand end of that shaft. That anti-friction bearing has the races and balls thereof made of magnetic material so they can serve as part of the magnetic path in the magnetic clutch. The outer race of the anti-friction bearing 82 is seated in a concentrically formed recess 84 in the right hand end of a driving shaft 88. That recess is undercut, as at 86, to provide full and free rotation of the inner race of bearing 82 relative to the driving shaft 88.

The driving shaft 88, which is made of magnetic material, has a reduced diameter portion 90 at its left hand end; and that reduced diameter portion telescopes into the inner race of the anti-friction bearing 38. The left hand end of the driving shaft 88 also has a concentrically formed cylindrical recess 92, and that recess holds a sleeve bearing 94 and an oil seal 96. With this arrangement, the right hand end of the driven shaft 64 is supported by the sleeve bearing 62 seated in the annular projection 58 on closure 54, and that right hand end supports the right hand end of driving shaft 88 through the medium of anti-friction bearing 82. The left hand end of the driven shaft 64 is supported by the left hand end of the driving shaft 88 through the medium of the sleeve bearing 94, and that left hand end of the driving shaft is supported by the anti-friction bearing 38 in recess 30 of cylinder 20. The recess 30 of cylinder 20, the seat 60 of closure 54, the recess 84 of driving shaft 88, the reduced diameter portion 90 of that driving shaft 88, and the recess 92 of that driving shaft are all formed so they are precisely concentric. The overall interaction of these concentric surfaces makes it possible to hold the driven shaft 64 and the driving shaft 88 precisely concentric; all as required for high speed rotation of those shafts.

The left hand end of the driving shaft 88 projects through the opening 28 in the left hand end of cylinder 20; and a flanged hub 98 is mounted on that projecting left hand end. The flanged hub has an axial opening of reduced diameter in its left hand end, and the left hand end of the driven shaft 64 extends through that opening. The flanged hub may be suitably keyed or otherwise secured to the driving shaft 88. Three circumferentially spaced openings 100 are provided in the flange of the flanged hub 98. Those openings are threaded to receive screws or bolts; and those screws or bolts will secure a gear, pulley or other rotation imparting mechanism to the flanged hub 98.

The driving shaft 88 has a radially extending annular portion 102; and that portion as well as the rest of the driving shaft 88, serves as part of the magnetic path in the magnetic clutch. An annular seat 104 is formed on the radially extending annular portion 102 of the driving shaft 88; and an annular plate 106 of a sturdy non-magnetic material, such as stainless steel, is tightly pressed onto that seat. The engagement between the annular plate 106 and the seat 104 is so tight that the plate 106 rotates as a unitary portion of the driving shaft 88. A non-metallic facing 108, preferably of cork, is cemented or otherwise secured to the right hand face of the annular plate 106; and this facing is in register with, and can selectively engage, the left hand face of clutch plate 76.

A rim 110 of magnetic material is tightly pressed onto the outer periphery of the annular plate 106; and that rim serves as part of the magnetic path in the magnetic clutch. The rim 110 is immediately adjacent the right hand end face of the cylinder 20, and it is immediately adjacent the outer periphery of the clutch plate 76. Consequently, that rim transmits the magnetic lines of force from the cylinder 20 to the clutch plate 76. A very small air gap exists between the rim 110 and the clutch plate 76 whenever that clutch plate engages the non-metallic facing 108, and a very small air gap exists between the end face of the cylinder 20 and the rim 110. However, those air gaps are so small that the magnetic lines of force readily bridge them.

The engagement between the rim 110 and the annular plate 106 is so tight that the rim 110 rotates as a unitary part of the driving shaft 88. The annular plate 106 is desirable because it does not short-circuit the magnetic lines of force; and consequently those lines of force pass to and through the clutch plate 76.

The various component parts of the magnetic clutch provided by the present invention are readily assembled, and they also may be dis-assembled readily. In manufacturing the magnetic clutch of the present invention, the coil form 40, the coil 48, the spacer 42, the annular plate 50 and the leads 46 are made up as one sub-assembly, the driving shaft 88, the annular plate 106, the facing 108, the rim 110, the anti-friction bearing 82, and the sleeve bearing 94 are made up as a second sub-assembly, and the driven shaft 64, the spring 68, the clutch plate 76, the brake 72, the facing 74, and the screws 78 are made up as a third sub-assembly. In assembling the magnetic clutch of the present invention, the bushings 44 are threaded into position, and the outer race of the anti-friction bearing 38 is pressed into the recess 30 of the cylinder 20. Thereafter, the leads 46 are passed through the bushings 44, and those leads are drawn outwardly through those bushings as the coil form 40 with its mounted elements is telescoped into the recess 32. The locking ring 52 is then set in the recess 32 and is pressed up against the plate 50. That ring will hold the coil form 40 with its mounted elements against accidental displacement or dislodgment.

The washer 80 is telescoped over the left hand end of the driven shaft 64, and the washer 66 is telescoped over the right hand end of that shaft. Those washers are set closely adjacent the hub of the spring 68. Thereupon, the left hand end of the driven shaft 64 is telescoped through the anti-friction bearing 82 and through the sleeve bearing 94. At this time, the shafts 64 and 88 can be handled as a unit, and that unit is telescoped into the recess 32 of the cylinder 20 until the reduced diameter portion 90 of the driving shaft 88 telescopes into the inner race of the anti-friction bearing 38. Thereupon the closure 54 is placed adjacent the right hand end of the driven shaft 64; and that shaft is moved until its right hand end seats in the sleeve bearing 62. Once this has been done, the recess 56 in the closure 54 can be telescoped over the right hand end of the cylinder 20. The various concentrically formed cylindrical surfaces of the magnetic clutch will hold the two shafts 64 and 88 precisely concentric with each other and with cylinder 20 and closure 54.

The oil seal 96 is then set in the recess 92 of the driving shaft 88. This seal will be of standard and usual design. The flanged hub 98 is suitably secured to the left hand end of the driving shaft 88; and this completes the assembly of the magnetic clutch.

Figure 1:
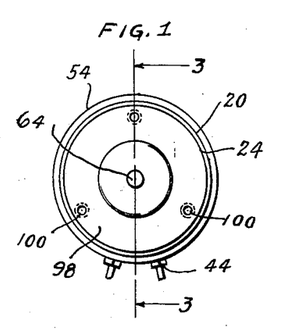
Fig. 1 is an end view of a magnetic clutch that is made in accordance with the principles and teachings of the present invention.
Figure 2:
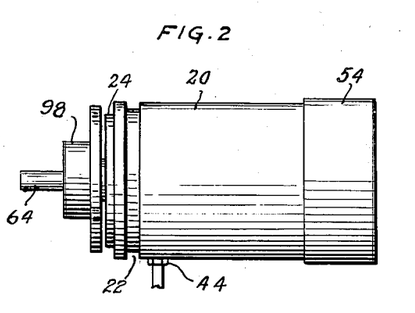
Fig. 2 is a side elevational view of the magnetic clutch of Fig. 1.
Figures 3, 4:
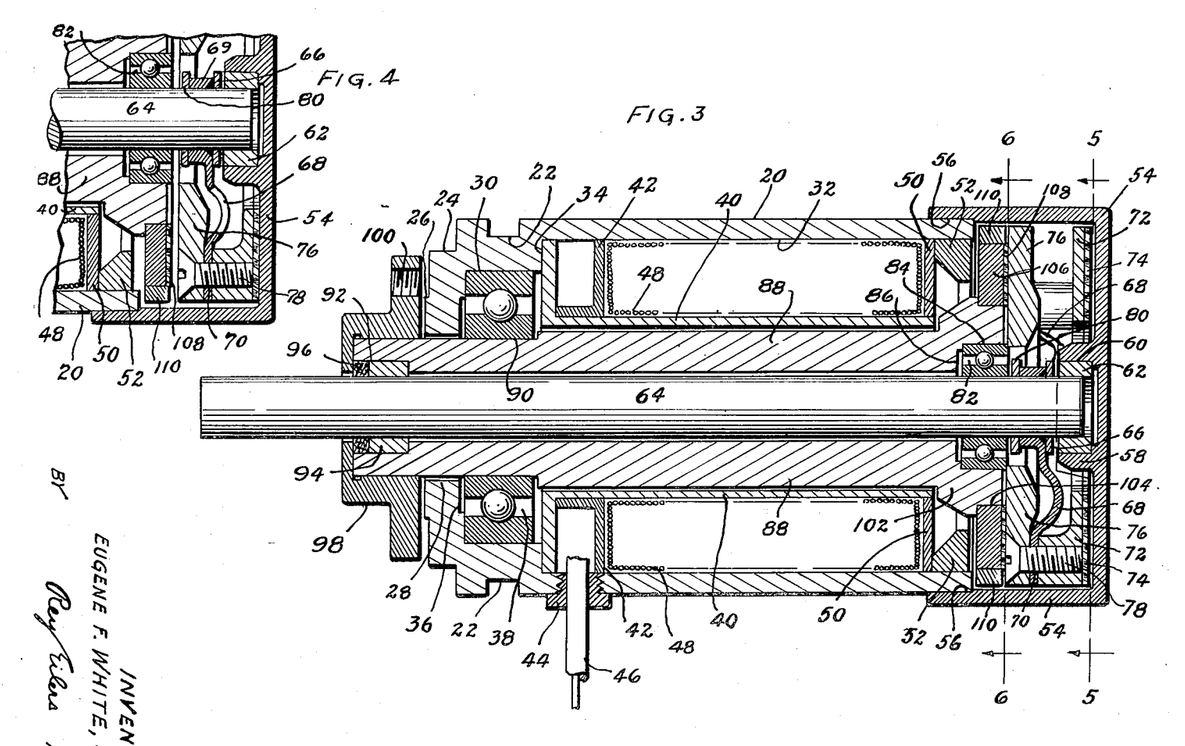
Fig. 3 is a longitudinal section through the magnetic clutch of Fig. 1, and it is taken along the plane indicated by the line 3—3 in Fig. 1.
Fig. 4 is a partial longitudinal section through the magnetic clutch of Fig. 1, and it is taken along the plane indicated by the line 3—3 in Fig. 1, but it shows the parts of that clutch in braking position.
Figure 5:
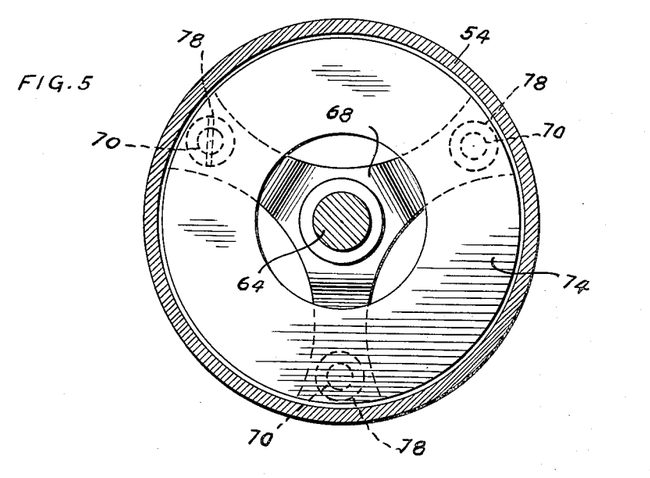
Fig. 5 is a cross section through the magnetic clutch of Fig. 1, and it is taken along the plane indicated by the line 5—5 in Fig. 3.
Figure 6:
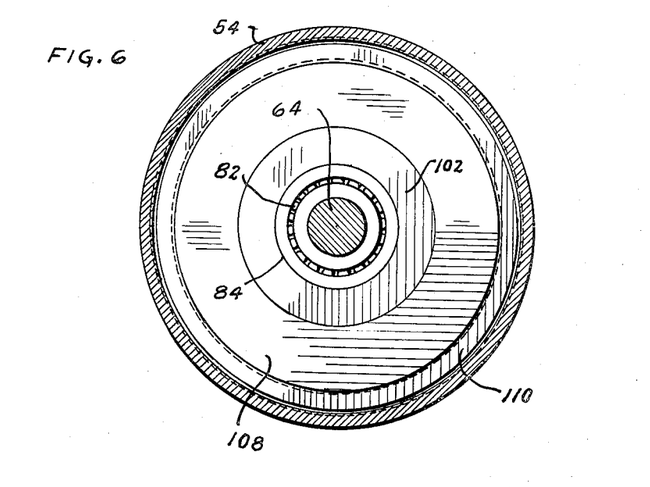
Fig. 6 is a cross section through the magnetic clutch of Fig. 1, and it is taken along the plane indicated by the line 6—6 in Fig. 3.

In the particular form of magnetic clutch shown in the drawing, the coil 48 is normally de-energized, and the spring 68 normally holds the brake 72 in braking position against the end wall of closure 54, all as shown in Fig. 4. At such time the non-metallic brake facing 74 will engage that end wall and the clutch plate 76 will be out of engagement with the non-metallic clutch facing 108. Consequently, in the particular form of magnetic clutch shown by Figs. 3 and 4, the driven shaft 64 is normally held against rotation but the driving shaft can run constantly.

When the coil 48 is energized, magnetic lines of force will pass longitudinally through the cylindrical portion of the cylinder 20, inwardly through the radial portions of that cylinder and through the anti-friction bearing 38 and through the flange of the coil form 40, longitudinally through the cylindrical portion of the coil form 40 and through the driving shaft 88 and through the radially extending portion 102 of the driving shaft 88 and through the outer race of the anti-friction bearing 82 and through the air gap between the right hand end of the driving shaft 88 and the left hand face of the clutch plate 76, radially outwardly through the clutch plate 76, and then longitudinally through the air gap between the left hand face of the clutch plate 76 and the right hand face of the rim 110 and through the rim 110 and through the air gap between the rim 110 and the cylinder 20. The wall thickness of the cylinder 20 is considerably smaller than the combined thickness of the driving shaft 88 and the cylindrical portion of the coil form 40, but the much greater diameter of the cylinder 20 makes the total cross sectional area of the cylinder 20 sufficiently large to carry the magnetic lines of force. The magnetic lines of force apply strong attracting forces to the clutch plate 76.

Those attracting forces are resisted by the spring 68; but as those forces increase, during the energization of the coil 48, the arm of spring 68 which has the narrowest dimension, namely X3, will be unable to hold its portion of the clutch plate 76 against movement. Thereupon, the portion of the clutch plate 76 which is secured to that arm will move to the left in Figs. 3 and 4, and it will come into engagement with the non-metallic clutch face 108 which is rotating with the driving shaft 88. While this is happening, the portions of the clutch plate 76 that are secured to the other two arms of the spring 68 remain in engagement with the end wall of the closure 54. Consequently, at this time the clutch plate 76 will be held against rotation; and, as a result, there will be some slipping between the clutch plate 76 and the non-metallic clutch face 108. The attracting forces generated by the coil 48 will continue to increase as the inductive effect of the coil tapers off, and the arm with the next smallest dimension, namely X2, will be unable to continue to hold its portion of the clutch plate 76 against movement toward the non-metallic clutch facing 108. After that second arm of spring 68 has yielded, the portions of the clutch plate 76 secured to the narrowest and second narrowest arms will be in engagement with the non-metallic clutch facing 108. The portion of the clutch plate 76 which is secured to the arm of the spring 68 having the widest dimension, namely X1, will still engage the end wall of the closure 54, but that engagement will not be sufficient to prevent rotation of the driven shaft 64 under the influence of the driving shaft 88. Conseqently, there will be rotation of that shaft accompanied by slipping between the end wall of the closure 54 and that portion of the braking surface 74 in register with the widest arm of the spring 68. Even the widest arm of the spring 68 will yield under the attracting forces generated by the coil 48; and thereupon the brake face 74 will move completely out of engagement with the end wall of the closure 54, all as indicated in Fig. 3.

While the spring 68 yields in this step-by-step manner, the movement of the clutch plate 76 and brake 72 is prompt and takes only a fraction of a second. Nevertheless, the step-by-step yielding of the spring 68, and the consequent step-by-step movement of clutch plate 76 and brake 72 is vital and important since it positively precludes any free rotation of the driven shaft 64. Either the shaft 64 is stationary or it is rotating under the influence of the driving shaft 88.

Figures 7, 8, 9:
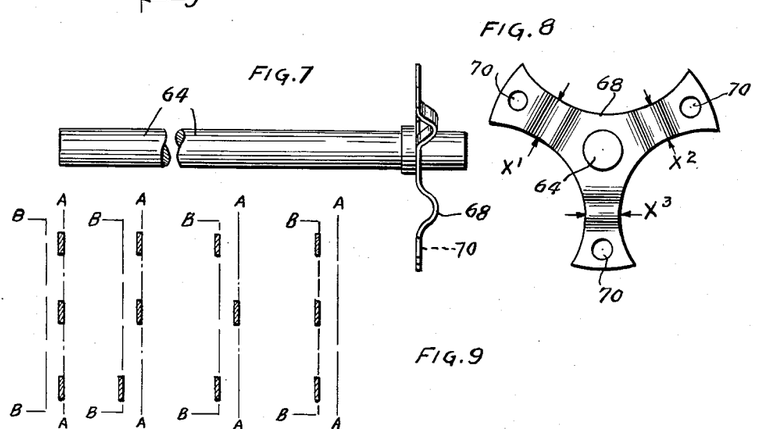
Fig. 7 is a broken side elevational view of the driven shaft and leaf spring used in the magnetic clutch of the present invention.
Fig. 8 is an end view of the shaft and spring of Fig. 7.
Fig. 9 is a diagram indicating the step-by-step bending of the spring.

The step-by-step yielding of the spring 68 is emphasized by the four sections of the diagram of Fig. 9. Initially, the three arms of the spring 68 are in the plane denoted by the letter A; all as indicated by the left hand section of the diagram of Fig. 9. As the narrowest arm yields, it moves to the plane denoted by the letter B, but the other two arms remain in the plane denoted by the numeral A; all as indicated by the second-from-the-left section of the diagram of Fig. 9. When the next narrowest arm yields, that arm moves to plane B; all as indicated by the second-from-the-right section of the diagram of Fig. 9. The yielding of the widest arm of spring 68 permits all of the arms to be in plane B; all as indicated at the right hand section of the diagram of Fig. 9. The movement of the arms of the spring 68 from plane B to plane A will occur in the reverse order; and it will again cause a step-by-step movement of the clutch plate 76 and the brake 72 rather than a completely axial movement. Any such axial movement would permit the driven shaft 64 to be free of the influence of the brake 72 or of the driving shaft 88 for a short period. During this step-by-step movement toward and away from clutching position, the clutch plate 76 will have its axis inclined at different angles to the axis of the driven shaft 64. However, when the clutch plate reaches full clutching position or full braking position, its axis is coaxial with the axis of the driven shaft 64.

The coil 48 will be energized by direct current, and when that coil is energized the inductive effect of that coil will initially retard the flow of current through that coil. Consequently, the current, and hence the magnetic lines of force, of the coil must build up gradually. This gradual build up coacts with the differences between the strengths of the arms of the spring 68 to provide the important step-by-step movement of clutch plate 76 and brake 72.

Figure 10:
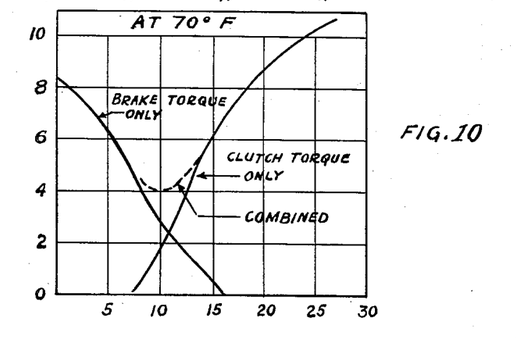
Fig. 10 is a chart showing brake torque and clutch torque.

The graph in Fig. 10 indicates how the brake torque and the clutch torque vary with changes in voltage, and they also indicate generally how the brake torque decreases and the clutch torque increases during an energization of the coil 48. In that graph, the ordinate is demarked in inch ounces while the abscissa is demarked in volts. When no voltage was applied to coil 48, a brake torque in excess of eight (8) inch ounces was attained. As the voltage was raised to five (5) volts, the brake torque dropped to a little over six (6) inch ounces. When the voltage reached ten (10) volts, the brake torque was slightly less than three (3) inch ounces; and the brake torque became zero when the voltage slightly exceeded fifteen (15) volts. The curve marked "brake torque only" indicates generally how the braking forces decrease during each energization of the coil 48. Prior to the time the brake torque reached zero, the clutch torque became effective. Thus, at about seven and one-half (7½) volts, while the brake torque was still in the neighborhood of four (4) inch ounces, a clutch torque became perceptible. By the time the brake torque had fallen to two (2) inch ounces, the clutch torque had increased to three (3) inch ounces; and by the time the brake torque had decreased to zero, the clutch torque exceeded six (6) inch ounces. That clutch torque continued to increase until it exceeded ten (10) inch ounces when the volatge was twenty-five volts. The curve marked "clutch torque only" indicates generally how the clutching forces increase during each energization of the coil 48.

As indicated by the dashed line in Fig. 10, the total torque on the driven shaft 64 is not permitted to drop to zero, but instead is held at or above four (4) inch ounces. Hence, Fig. 10 graphically shows that the driven shaft 64 is never permitted to rotate freely under the influence of forces other than those supplied by the driving shaft 88. The upper part of the curve marked "brake torque only," the dashed line, and the upper part of the curve marked "clutch torque only" indicate generally the manner in which the braking forces hold the driven shaft 64 stationary until they decrease to the point where the clutching forces assume control of that driven shaft; and this happens during each energization of coil 48. As indicated above, this is exceedingly important since it prevents uncontrolled rotation of the driven shaft 64.

The magnetic clutches provided by the present invention are extremely efficient, and they provide very sizable torques for their size. For example, the graph of Fig. 10 was based on the performance of a magnetic clutch which had a closure 54 with an outside diameter of eighty one hundredths (0.81) of an inch. The overall length of the cylinder 20 and closure 54 of that magnetic clutch, when they were pressed into engagement, was one and one-quarter (1¼) inches. Yet, as the graph of Fig. 10 shows, that tiny magnetic clutch provided over ten (10) inch ounces of torque.

The non-metallic clutch facing 108 is made so its outer periphery is closely adjacent the inner periphery of the closure 54. This is desirable since it gives that facing a large diameter and thus a large area. However, that non-metallic clutch facing is spaced from the magnetic path of the magnetic clutch, as by being disposed inwardly of the rim 110. This is important since it makes it unnecessary for the magnetic lines of force to pass through the friction-applying surfaces of the magnetic clutch. As a result, the magnetic clutch of the present invention can use a non-metallic clutch face, and can thereby attain the high frictional coefficients attainable with non-metallic clutch facings.

The clutch plate 76 has its left hand face machined to provide an extremely uniform and smooth surface. Similarly, the left hand face of the end wall of the closure 54 is machined to provide an extremely uniform and smooth surface. Thereafter, those smooth surfaces are sand blasted to provide a roughening of a very uniform nature. This roughening enables those surfaces to coact with the cork surfaces 108 and 74 to provide high coefficients of friction. Theoretically, it would be possible to form grooves or ridges on the left hand face of the clutch plate 76 and on the left face of the wall of the closure 54, but because of the enforced slippage between elements 108 and 76 and between the faces 74 and the end wall of the closure 54 during the step-by-step movement of the clutch plate 76, those ridges or grooves can not be used. Any such ridges or grooves would tend to tear up the cork facings 108 and 74.

The driven shaft 64 of the magnetic clutch provided by the present invention is held against axial movement; and this is desirable since it avoids the looseness noted in magnetic clutches wherein one of the shafts experienced axial movement. That looseness usually is provided by a spline or by a slot and pin arrangement; and that looseness is very objectionable because magnetic clutches can be subjected to intense vibration at high frequencies. That vibration can start the shaft reciprocating, and the reciprocation can sometimes become hammer-like in nature and intensity. By obviating any axial movement of the driven shaft 64, and of the driving shaft 88, the present invention eliminates the possibility of hammer-like reciprocation. Furthermore, by obviating any axial movement of the driven shaft 64 and of the driving shaft 88, the present invention obviates all need of wide-faced pulleys or of belt or chain drives that can adjust to different inclinations. Moreover, by obviating any axial movement of the driven shaft 64 and of the driving shaft 88, the present invention obviates the "back lash" and "play" that is inherent in splines, pins and slots or other loose connections.

The leaf spring 68 is very desirable because it provides the important step-by-step movement of clutch plate 76 and brake 72 relative to facing 108 and the end wall of closure 54. That spring is also desirable because it is not subject to the inertia problems inherent in helical springs. This is important because the magnetic clutch of the present invention should be able to withstand intense vibration at high frequencies.

The magnetic clutch of the present invention will preferably be made so it can provide a braking action as well as a clutching action. However, if desired, that magnetic clutch could be made so it provides only a clutching action or only a braking action. In the one case the magnetic clutch would be usable solely as a clutch, and in the other case it would be used solely as a brake. When the magnetic clutch is to be used solely as a clutch, the closure 54 will be formed so the space between the end wall of that closure and the right hand end of the cylinder 20 is greater than normal. This means that when the spring 68 moves the brake 72 to the right as far as it can, the braking face 74 on that brake will not engage the end wall of the closure 54. Where this is done, the driven shaft 64 is free to rotate at all times when the coil 48 is de-energized. However, as soon as the coil 48 is energized, the driven shaft 64 is connected to the driving shaft 88 for conjoint movement.

When the magnetic clutch is to be used solely as a brake, the output shaft is not connected to anything; and the hub 98 will preferably be replaced by a simple packing-retaining ring on shaft 88. A suitable hub or gear will be connected to the output shaft 64; and the driving shaft will merely serve as a support for the driven shaft 64. Whenever the coil 48 is deenergized, the spring 68 will force the braking face 74 into engagement with the end wall of the closure 54 and thereby brake the driven shaft 64 against rotation. However, when the coil 48 is energized, the brake 72, and its surface 74, will be moved away from the end wall of the closure 54, and the driven shaft 64 will be free to rotate.

The driven shaft 64 is shown projecting through and beyond just one end of the magnetic clutch. That driven shaft can be, and has been, made so it projects through and beyond both ends of the magnetic clutch. All that need be done to have the driven shaft project through and beyond both ends of the magnetic clutch is to bore an opening in the wall of the closure 54 in register with sleeve bearing 62 and use a longer driven shaft 64.

The washers 66 and 80 are intended to, and do, control the position of the hub of the spring 68 relative to the end wall of the closure 54. In doing so, they control the initial force applied by the spring 68 to the braking surface 74. By increasing the thickness of the washer 66 and by decreasing the thickness of the washer 80, it is possible to reduce the braking torque of the magnetic clutch. By increasing the thickness of the washer 80 and by decreasing the thickness of the washer 66, it is possible to increase that braking torque.

The magnetic clutch of the present invention can also be used to provide a variable torque. This variation is, of course, not without limits; but within importantly usable limits, desirable variations in torque can be attained by adjusting the voltage that is applied across the coil 48. All that need be done is select the desired range of clutch torques, and then adjust the voltage that is applied across the coil 48. Reference to the graph of Fig. 10 will indicate the permissive limits of clutch torque and the requisite voltages across the coil 48.

Whereas a preferred embodiment of the present invention has been shown and described in the drawing and accompanying description it should be apparent to those skilled in the art that various changes may be made in the form of the invention without affecting the scope thereof.

What I claim is:

1. A magnetically-operated, rotation-controlling device that has a housing, a coil that is telescoped and fixedly held within said housing and that generates flux lines, a shaft that is telescoped within said coil and said housing and that has one end thereof extending through and projecting beyond one end of said housing, bearings that support said shaft and permit said shaft to rotate relative to said coil and said housing, an annular member of magnetic material, and a spring that is fixedly secured to and supported by said shaft, said spring having a plurality of arms that project outwardly from said shaft and that are secured to and support said annular member, said arms of said spring biasing said annular member toward a normal position spaced away from said coil, said annular member responding to said flux lines to cause said arms of said spring to flex and thereby permit said annular member to move toward said coil, one of said arms having a cross section greater than the cross section of a second of said arms and a third said arm having a cross section smaller than the cross section of said second arm whereby said third arm will flex before the first said and said second arms flex and whereby said second arm will flex before the first said arm flexes as said annular member responds to said flux lines to cause said arms to flex, the flexing of said third arm before the flexing of said second arm and the flexing of said second arm before the flexing of the first said arm causing said annular member to shift its axis relative to the axis of said shaft and thereby provide step-by-step movement of said annular member as it moves from said normal position toward said coil.

2. A magnetically-operated, rotation-controlling device that has a housing, a coil that is telescoped and fixedly held within said housing and that generates flux lines, a hollow shaft telescoped within said housing and said coil, bearings that support said hollow shaft for rotation relative to said coil and said housing, a second shaft telescoped within said hollow shaft, bearings that support said second shaft for rotation relative to said hollow shaft and said coil and said housing, an annular member of magnetic material, and a generally flat spring that is secured to and supported by said second shaft and that extends outwardly from said shaft to engage and support said annular member, said spring biasing said annular member to a normal position spaced from said coil, said annular member responding to said flux lines to flex said spring and thereby move toward said coil, said annular member being movable in one direction to engage and rotate with a portion of said hollow shaft and being movable in the opposite direction to engage a braking surface and be brought to rest, said spring having circumferentially spaced portions thereof that have individually different amounts of resistance to flexing whereby the circumferentially spaced portion of said spring having the least resistance to flexing will flex before the remaining circumferentially spaced portions of said spring flex as said annular member moves in response to said flux lines and whereby the circumferentially spaced portion of said spring having the greatest resistance to flexing will flex after the rest of the circumferentially spaced portions of said spring flex as said annular member moves in response to said flux lines, the flexing of the circumferentially spaced portions of said spring which have different resistances to flexing being progressive and causing said annular member to tilt as it moves from said normal position toward said coil, said tilting enabling said annular member to simultaneously engage said hollow shaft and said braking surface.

3. A magnetically-operated, rotation-controlling device that has a housing, a coil that is telescoped and fixedly held within said housing and that generates flux lines, a shaft that is telescoped within said coil and said housing, bearings that support said shaft and permit said shaft to rotate relative to said coil and said housing, an annular member having at least a portion thereof of magnetic material, a resilient member that is secured to and supported by said shaft, said resilient member projecting outwardly from said shaft to engage and support said annular member and to cause said annular member to rotate with said annular shaft an engageable member that is adjacent one face of said annular member and that can be engaged by said annular member to prevent relative rotation between itself and said annular member or that can have said annular member spaced from it to permit relative rotation between itself and said annular member, and a second engageable member that is adjacent the opposite face of said annular member and that can be engaged by said annular member to prevent relative rotation between itself and said annular member or that can have said annular member spaced from it to permit relative rotation between itself and said annular member, said annular member being thinner than the space between said engageable members whereby said annular member said engage only one of said engageable members at a time whenever said annular member has the axis thereof coaxial with the axis of said shaft, said annular member being capable of engaging both of said engageable members as the axis thereof is inclined to the axis of said shaft, said resilient member normally holding said annular member in a normal position in engagement with one of said engageable members and with its axis coaxial with the axis of said shaft whenever said coil is de-energized, said flux lines holding said annular member in engagement with the other of said engageable members and with its axis coaxial with the axis of said shaft whenever said coil is energized, said annular member responding to said flux lines to flex said resilient member and to move from its normal position into engagement with said other of said engageable members, said resilient member having circumferentially spaced portions thereof that will flex in response to the energization of said coil before other circumferentially spaced portions of said resilient member will flex, whereby the portions of said annular member adjacent the first said circumferentially spaced portions of said resilient member will move toward said coil before the portions of said annular member adjacent said other circumferentially spaced portions of said resilient member can move toward said coil, the movement of the first said portions of said annular member in advance of the movement of the second said portions of said annular member causing the axis of said annular member to tilt relative to the axis of said shaft and thereby causing said annular member to engage said other of said engageable members before moving out of engagement with said one of said engageable members.

4. A magnetically-operated, rotation-controlling device that has a housing, a coil that is telescoped and fixedly held within said housing and that generates flux lines, a shaft telescoped within said housing and said coil, bearings that support said shaft for rotation relative to said coil and said housing, a second shaft that is telescoped within said housing and that is coaxial with the first said shaft, bearings that support said second shaft for rotation relative to the first said shaft and said coil and said housing, an annular member that has at least a part thereof made of magnetic material and that is disposed adjacent a surface on the first said shaft, an engageable member that is disposed within said housing and that has a surface thereon which is spaced from said surface on the first said shaft but is adjacent said annular member, and a resilient member, said resilient member being secured to and supported by and rotatable with said second shaft and extending outwardly from said second shaft to engage and be secured to the outer portions of said annular member to cause said annular member to rotate with said second shaft, the areas of securement between said resilient member and said annular member being spaced further from the periphery of said second shaft than they are from the periphery of said resilient member to assure ready flexing of said resilient member, said surface on said engageable member being spaced from said surface on the first said shaft a distance that is slightly greater than the thickness of said annular member, whereby said annular member cannot simultaneously engage both of said surfaces unless it is tilted relative to the axis of said second shaft, said resilient member biasing said annular member to a normal position in engagement with one of said surfaces and out of engagement with the other of said surfaces, said annular member responding to said flux lines to flex said resilient member and thereby move out of engagement with the said one surface and into engagement with said other surface, said annular member being held against rotation relative to said surface on the first said shaft but being rotatable relative to said surface on said engageable member whenever said annular member is in full engagement with said surface on the first said shaft and being held against rotation relative to said surface on said engageable member whenever said annular member is in full engagement with said surface on said engageable member, said resilient member having portions that will flex readily when said annular member responds to said flux lines and having other portions that will flex less readily when said annular member responds to said flux lines, whereby said annular member will tilt as it responds to said flux lines and starts to move from its normal position in engagement with said one surface toward said other surface, said tilting causing said annular member to move into partial engagement with said other surface before said annular member can move wholly out of engagement with said one surface.

5. A totally-enclosed, magnetically-operated, rotation-controlling device that has a housing of magnetic material, said housing having one end thereof open and having an opening in the other end thereof, a coil that is telescoped and fixedly held within said housing and that generates flux lines, a tubular member of magnetic material that is telescoped within said housing and within said coil, said housing and said tubular member constituting the major part of the path for the flux lines generated by said coil, a shaft that is telescoped within said tubular member and said coil and said housing and that has one end thereof extending through and projecting beyond said open end of said housing and that has the other end thereof extending through and projecting beyond said opening in said other end of said housing, bearings that support said shaft and permit said shaft to rotate relative to said tubular member and said coil and said housing, an annular member of magnetic material that is disposed outwardly of but adjacent said open end of said housing, said annular member having an outer diameter that is smaller than the outer diameter of said open end of said housing but is larger than the inner diameter of said open end of said housing, said annular member having an inner diameter that is smaller than the outer diameter of said tubular member, said annular member having a face that is immediately adjacent and in confronting relation with one end of said tubular member, a resilient member that is fixedly secured to and carried by said shaft and that supports said annular member and resiliently secures said annular member to said shaft to cause said annular member to rotate with said shaft, said resilient member biasing said annular member for movement axially of said shaft relative to said housing and relative to said tubular member, said resilient member being adapted to flex and thereby permit said annular member to move axially of said shaft relative to said one end of said tubular member and relative to said open end of said housing, a cup-like closure for said open end of said housing, said cup-like closure telescoping over and enclosing said annular member and said resilient member, said cup-like closure and said housing coacting to totally enclose said coil and said annular member and said resilient member, said annular member being part of the said path for flux lines generated by said coil, said annular member being movable in one direction axially of said shaft by said resilient member but responding to said flux lines from said coil to move in the opposite direction axially of said shaft, and a surface on said tubular member toward which one surface of said annular member can move during movement of said annular member axially of said shaft and that responds to engagement between itself and said one surface of said annular member to prevent relative rotation between itself and said one surface of said annular member.

6. A totally-enclosed, magnetically-operated, rotation-controlling device that has a casing which includes a housing of magnetic material with one end thereof open and which includes a closure for said open end of said housing, a coil that is telescoped and fixedly held within said housing and that generates flux lines, a tubular member of magnetic material that is disposed within said casing and that extends into said coil, said tubular member and said housing constituting a major part of the path for the flux lines generated by said coil, said tubular member having a wall thickness greater than the wall thickness of said housing whereby the reluctance of said tubular member is not unduly greater than the reluctance of said housing, a shaft that is telescoped within said tubular member and said coil and said housing and that has one end thereof extending through and projecting beyond said open end of said housing and that has the other end thereof extending through and projecting beyond the other end of said housing, bearings that support said shaft and permit said shaft to rotate relative to said tubular member and said coil and said housing, an annular member of magnetic material that is disposed adjacent one end of said tubular member of magnetic material to interchange flux lines with said tubular member of magnetic material, said annular member being rotatable with said shaft, the inner portions of said annular member being thicker, in a direction parallel to the axis of said shaft, than are the outer portions of said annular member whereby the reluctance of said inner portions of said annular member is not unduly greater than the reluctance of said outer portions of said annular member, said annular member extending outwardly from said shaft and approaching the inner surface of said casing whereby said annular member has a large area for the interchange of flux lines with said housing and whereby the moment arm of said area is substantially as large as possible, said annular member having an inner diameter that is smaller than the outer diameter of said tubular member, said annular member having a face that is immediately adjacent and in confronting relation with one end of said tubular member, a flexible member that spaces said annular member from said shaft and that permits movement of said annular member axially of said shaft relative to said housing and relative to said tubular member without frictional losses between said annular member and said shaft, said closure and said housing coacting to totally enclose and protect said coil and said annular member and said flexible member, said annular member being part of the said path for flux lines generated by said coil, said annular member being biased for movement in one direction axially of said shaft but responding to said flux lines from said coil to move in the opposite direction axially of said shaft, and an engageable member that is disposed within said casing and that has a surface thereon toward which one surface of said annular member can move during movement of said annular member axially of said shaft and that responds to engagement between itself and said one surface of said annular member to prevent relative rotation between itself and said one surface of said annular member.

7. A totally-enclosed, magnetically-operated, rotation-controlling device that has a coil that generates flux lines, a tubular member of magnetic material that is telescoped within said coil and that projects outwardly beyond the ends of said coil, a shaft that is telescoped within said tubular member and said coil, bearings that support said shaft and permit said shaft to rotate relative to said tubular member and said coil, an annular member of magnetic material that is rotatable with said shaft, a flexible element that is secured to said shaft and that spaces said annular member from said shaft to mount said annular member for movement axially of said shaft without frictional engagement between said annular member and said shaft, a rigid housing of magnetic material that telescopes over said coil and that has an open end, a rigid cup-like closure that abuts said housing and that closes said open end of said housing, said cup-like closure and said housing coacting to constitute a rigid enclosure that totally encloses and protects said coil and said annular member and said flexible member, said housing performing the dual function of coating with said cup-like closure to fully enclose and protect said coil and said annular member and said flexible member and of coacting with said tubular member to provide the major part of the magnetic path for said flux lines, said cup-like closure performing the dual function of coacting with said housing to fully enclose said coil and said annular member and said flexible member and of supporting one of said bearings for said shaft, said annular member being part of the said path for flux lines generated by said coil, said annular member being biased for movement in one direction axially of said shaft but responding to said flux lines from said coil to move in the opposite direction axially of said shaft, and an engageable member that is adjacent said annular member and that has a surface thereon toward which one surface of said annular member can move during movement of said annular member axially of said shaft and that responds to engagement between itself and said one surface of said annular member to prevent relative rotation between itself and said one surface of said annular member, said annular member being disposed adjacent said open end of said housing and being disposed outwardly beyond one end of said coil and having an outer diameter larger than the inner diameter of said coil, said annular member and said open end of said housing interchanging flux lines and said annular member and said tubular member also interchanging flux lines.

8. A magnetically-operated, rotation-controlling device that has a housing of magnetic material, said housing having one end thereof open, a coil that is telescoped and fixedly held within said housing and that generates flux lines, a hollow shaft that is telescoped within said housing and within said coil and that projects outwardly beyond both ends of said coil, a set of bearings that support said hollow shaft for rotation relative to said housing and said coil, a second shaft that is telescoped within said hollow shaft and said coil and said housing and that projects outwardly beyond both ends of said hollow shaft, a second set of bearings that support said second shaft for rotation relative to said hollow shaft and said coil and said housing, an annular member of magnetic material that is disposed outwardly of said coil, a resilient member that is fixedly secured to and carried by said second shaft and that supports said annular member and resiliently secures said annular member to said second shaft, said resilient member biasing said annular member for movement axially of said second shaft relative to said housing and relative to said hollow shaft, said resilient member being adapted to flex and thereby permit said annular member to move axially of said second shaft relative to said coil, and a closure for said open end of said housing, said annular member being part of the said path for flux lines generated by said coil, said annular member being movable in one direction axially of said second shaft by said resilient member but responding to said flux lines from said coil to move in the opposite direction axially of said second shaft, one of the bearings of the first said set of bearings being intermediate said hollow shaft and said housing and the other of those bearings being intermediate said hollow shaft and said second shaft, one of the bearings of said second set of bearings being intermediate said hollow shaft and said second shaft and the other of those bearings being intermediate said second shaft and said closure, said other bearing of the first said set of bearings and said one bearing of said second set of bearings being adjacent the opposite ends of said hollow shaft and thereby assuring optimum concentricity of said hollow shaft and said second shaft, said resilient member spacing said annular member from said second shaft and thereby obviating frictional forces between said annular member and said second shaft.

9. A magnetically-operated, rotation-controlling device that has a housing, a coil that is telescoped and fixedly held within said housing and that generates flux lines, a shaft that is telescoped within said coil and said housing, bearings that support said shaft and permit said shaft to rotate relative to said coil and said houisng, a clutch and brake member that is at least partially made of magnetic material and that has a clutching face and a braking face, a resilient member that is secured to and supported by said shaft, said resilient member engaging and supporting said clutch and brake member and spacing said clutch and brake member from said shaft to obviate frictional forces between said clutch and brake member and said shaft, a rotatable driving surface adjacent said clutching face of said clutch and brake member, a braking surface adjacent said braking face of said clutch and brake member, said rotatable driving surface and said braking surface being spaced apart a distance slightly greater than the distance between said clutching face and said braking face of said clutch and brake member, whereby said clutch and brake member can engage only one of said surfaces at a time whenever said clutch and brake member has the axis thereof coaxial with the axis of said shaft, said clutching face and said braking face of said clutch and brake member simultaneously engaging said rotatable driving surface and said braking surface, respectively, when said clutch and brake member has its axis tilted relative to the axis of said shaft, said clutching face of said clutch and brake member being engageable with said rotatable driving surface to hold the axis of said clutch and brake member substantially coaxial with the axis of said shaft, said braking face of said clutch and brake member being engageable with said braking surface to hold the axis of said clutch and brake member substantially coaxial with the axis of said shaft, said resilient member enabling said clutch and brake member to tilt its axis relative to the axis of said shaft whenever said clutch and brake member starts to move away from one or the other of said surfaces whereby said clutching face and said braking face of said clutch and brake member will simultaneously engage said rotatable driving surface and said braking surface, respectively, as said clutch and brake member starts to move away from one or the other of said surfaces, said simultaneous engagement interacting the clutch torque and the brake torque of said device to always maintain at least a predetermined minimum amount of force on said shaft.

10. A magnetically-operated, rotation-controlling device that has a housing of magnetic material, a coil that is telescoped and fixedly held within said housing and that generates flux lines, a tubular member of magnetic material that is telescoped within said housing and within said coil and that projects beyond both ends of said coil, said housing and said tubular member constituting the major part of the path for the flux lines generated by said coil, a shaft that is telescoped within said tubular member and said coil and said housing and that has both ends thereof projecting beyond the ends of said tubular member, bearings that engage said shaft and permit said shaft to rotate relative to said tubular member, one end of said tubular member having a recess therein and having a radially-projecting flange disposed outwardly of said recess, said recess accommodating one of said bearings, said flange providing an ample path for flux lines passing through said tubular member despite the presence of said recess, an engageable member that is closely adjacent said coil, an annular member of magnetic material that is disposed outwardly of said coil but is adjacent said engageable member, and a resilient member that is fixedly secured to and carried by said shaft and that is secured to said annular member to space said annular member from said shaft while resiliently securing said annular member to said shaft, said resilient member biasing said annular member for movement axially away from said engageable member, said resilient member being adapted to flex and thereby permit said annular member to move toward said engageable member in response to said flux lines, said annular member being part of the said path for flux lines generated by said coil.

11. A magnetically-operated, rotation-controlling device that has a housing, a coil that is telescoped and fixedly held within said housing and that generates flux lines, a shaft that is telescoped within said coil and said housing and that has one end thereof extending through and projecting beyond one end of said housing, bearings that support said shaft and permit said shaft to rotate relative to said coil and said housing, an annular member of magnetic material, and a spring that is fixedly secured to and supported by said shaft, said spring having a plurality of arms that project outwardly from said shaft and that are secured to and support said annular member, said arms of said spring biasing said annular member toward a normal position spaced away from said coil, said annular member responding to said flux lines to cause said arms of said spring to flex and thereby permit said annular member to move toward said coil, one of said arms having a cross section smaller than the cross section of any of said other arms whereby said one arm will flex before any of said other arms flex as said annular member responds to said flux lines to cause all of said arms to flex, the flexing of said one arm before the flexing of any of said other arms causing said annular member to tilt its axis relative to the axis of said shaft and thereby provide step-by-step movement of said annular member as it moves from said normal position toward said coil.

12. A magnetically-operated, rotation-controlling device that has a housing, a coil that is telescoped and fixedly held within said housing and that generates flux lines, a shaft that is disposed within said housing and said coil, bearings that support said shaft for rotation relative to said coil and relative to said housing, a second shaft disposed within said housing, bearings that support said second shaft for rotation relative to the first said shaft and said coil and said housing, an annular member of magnetic material, and a generally flat spring that is secured to and supported by said second shaft and that extends outwardly from said shaft to engage and support said annular member, said spring biasing said annular member to a normal position spaced from said coil, said annular member responding to said flux lines to flex said spring and thereby move toward said coil, said annular member being movable in one direction to engage and rotate with a portion of said first said shaft to cause simultaneous and conjoint rotation of said shafts and being movable in the opposite direction to move out of engagement with said portion of said first said shaft and thereby permit relative movement between said shafts, said spring having circumferentially spaced portions thereof that have individually different amounts of resistance to flexing whereby the circumferentially spaced portion of said spring having the least resistance to flexing will flex before the remaining circumferentially spaced portions of said spring flex as said annular member moves in response to said flux lines and whereby the circumferentially spaced portion of said spring having the greatest resistance to flexing will flex after the rest of the circumferentially spaced portions of said spring flex as said annular member moves in response to said flux lines, the flexing of the circumferentially spaced portions of said spring which have different resistances to flexing causing said annular member to tilt as it moves from said normal position toward said coil, said tilting of said annular member enabling said annular member to provide a partial connection of said shafts in advance of the full connection between said shafts.

References Cited in the file of this patent
UNITED STATES PATENTS

| 1,523,413 | Gent | Jan. 20, 1925 |
| 1,943,321 | Hyland | Jan. 16, 1934 |
| 2,039,714 | Fuller | May 5, 1936 |
| 2,054,210 | Weisenberg | Sept. 15, 1936 |
| 2,274,457 | Peets et al. | Feb. 24, 1942 |
| 2,315,298 | Thompson | Mar. 30, 1943 |
| 2,401,003 | Lear | May 28, 1946 |
| 2,407,757 | McCallum | Sept. 17, 1946 |
| 2,533,480 | Leininger et al. | Dec. 12, 1950 |
| 2,801,720 | Bachman | Aug. 6, 1957 |
| 2,859,845 | Bachman | Nov. 11, 1958 |